Figure 1:
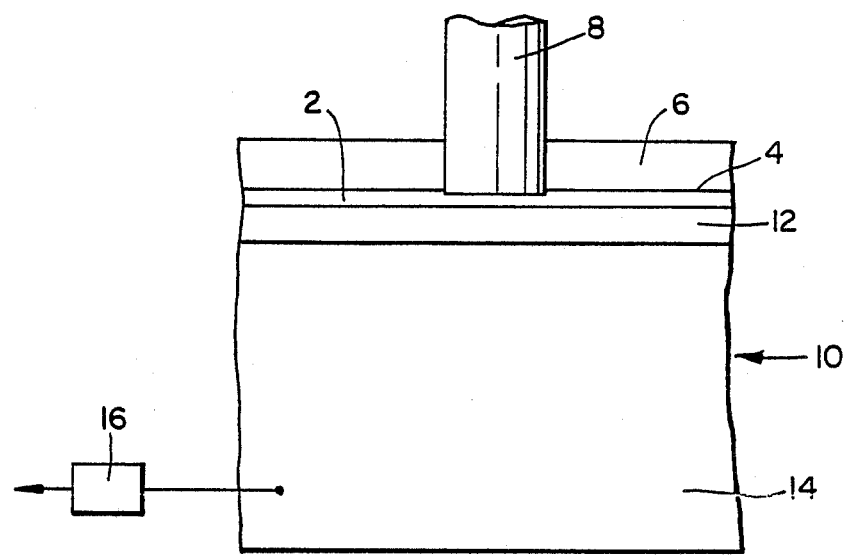

United States Patent [19]

Pilkington et al.

[11] Patent Number: 4,808,046
[45] Date of Patent: Feb. 28, 1989

[54] CUTTING METHOD

[75] Inventors: Donald J. Pilkington; Christopher I. Marlow, both of Northants, United Kingdom

[73] Assignee: Design Technologies Limited, United Kingdom

[21] Appl. No.: 81,071

[22] Filed: Jul. 14, 1987

[30] Foreign Application Priority Data

Jul. 14, 1986 [GB] United Kingdom ............. 8617114

[51] Int. Cl.⁴ ..................... B23C 1/00; B23Q 3/00
[52] U.S. Cl. ........................... 409/132; 51/235; 269/7; 269/21; 408/1 R; 408/87; 409/219
[58] Field of Search ............. 409/131, 132, 189, 197, 409/219; 408/1 R, 72 R, 87; 269/7, 21; 51/235

[56] References Cited

U.S. PATENT DOCUMENTS

| 3,074,392 | 1/1963 | Fisher | 408/1 |
|---|---|---|---|
| 3,749,625 | 7/1973 | Berg | 409/131 |
| 4,005,635 | 2/1977 | Feldcamp | 409/132 |
| 4,154,998 | 5/1979 | Luft et al. | 269/21 |
| 4,518,288 | 5/1985 | Cilindro | 409/219 |
| 4,667,944 | 5/1987 | Althouse | 269/21 |

Primary Examiner—Gil Weidenfeld
Assistant Examiner—Daniel W. Howell
Attorney, Agent, or Firm—Lowe, Price, LeBlanc, Becker & Shur

[57] ABSTRACT

A method of cutting out components from aluminum sheets utilizes a routing tool. The sheet is held firmly in position by vacuum on a vacuum table during the cutting operation with the aid of a film of for example plastics material adhered to the back of the sheet, the routing tool being arranged to cut through the sheet but only partially to penetrate the film.

14 Claims, 1 Drawing Sheet

CUTTING METHOD

This invention relates to methods of cutting, and particularly concerns such methods in which components are to be cut from a sheet of material. The invention is especially applicable to cutting metal components from metal sheets, especially aluminum sheets.

When cutting components from metal sheets using, for example, a routing tool it is necessary that the sheet, including the components which are to be cut out, should be held stationary during the cutting operation. One known method is to screw or rivet the sheet to a sacrificial backing layer which may, for example, by made of wood. The problem with this method is that screwing the metal sheet to the backing layer is a time consuming operation and since screws must be provided at those portions of the metal sheet which are to form the component or components, the resulting components have holes in them which may be undesired. Also the screws have to be removed after the cutting operation.

Another known method is to place the metal sheet on a polystyrene backing layer which in turn is placed on a vacuum table, the metal sheet then being held in position by vacuum. The problem with this method is that it has been found that it is only useful where relatively large components are to be cut from the metal sheet since it will not firmly hold small components during the final stages of a cutting operation.

Other proposals involve performing the cutting operation such that the component remains attached to the surrounding sheet by "tags" but these proposals suffer from the problem that a detagging operation and subsequent machining of the component edge to remove the vestiges of the tags are required.

The invention aims to solve the above problems.

In a preferred form, the invention provides a method of cutting a component from a sheet wherein the sheet is adhered to a backing member, for example by adhesive or other means, and is held firmly in position by the application of vacuum to the backing member.

Figure 2:
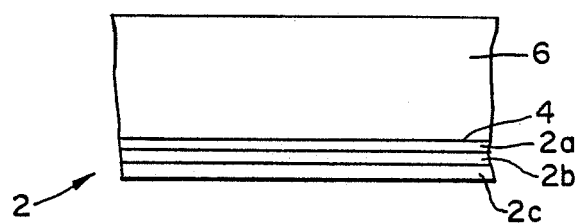

The invention is described further by way of example with reference to the accompanying drawings in which:

FIG. 1 is a diagrammatic sectional view illustrating a cutting operation in accordance with a preferred embodiment of the invention; and FIG. 2 illustrates a modification.

With reference to FIG. 1, a film 2 of plastics material is adhered to one surface 4 of a sheet of aluminium 6 which is to be cut into components of various shape utilising a routing tool 8. A vacuum apparatus 10 comprises a perforate table 12, a vacuum chamber 14 and a vacuum pump 16 connected to the chamber 14 as diagrammatically illustrated.

During a routing operation, the routing tool 8 is rotated about its own axis 18 at high speed, for example in the range 10,000 to 30,000 rpm and is moved, for example by an xy coordinate positioning system, along a path corresponding to the shape of the component to be cut. Both the rotation of the routing tool 8 and its movement along the path to be cut result in the application of forces to the sheet 6 which, necessitate firm means of securing the sheet 6 during the cutting operation. It has been found that in accordance with the preferred form of the invention, adequate securing of the sheet may be achieved by adhering the film 2 to the surface 4 and holding the resulting laminate in position by vacuum on the table 12 as illustrated in FIG. 1. As can also be seen in FIG. 1, the routing tool 8 penetrates only part way into the film 2 so that after the routing tool 8 has described the complete path required for cutting out a component, the component remains in position adhered to the film 2 despite having been completely severed from the surrounding sheet material. This method is particularly advantageous since it is economical, it is unnecessary to provide screw holes through the sheet 6, all of the components may remain attached to the film 2 for further processing and, when the components have been completed, they may easily be removed from the film 2 without the need for a "detagging" operation.

A particularly suitable material for the film 2 is Novacel protection mask which is obtainable from Novacel UK, 8 The Saracen Estate, Mark Road, Hemel Hempstead, Hertfordshire. This material is provided with a film of adhesive and can easily be peeled off from the aluminum sheet at the end of the operation, leaving a clean surface on the components. In the embodiment shown in FIG. 1, the film 2 is a unitary film i.e. itself a single sheet. In the embodiment shown in FIG. 2, the film 2 is made up of three sub-films 2a, 2b, 2c preferably all of the same material which, as with FIG. 1, is preferably Novacel protection mask. In this way, the thickness of film 2 may be increased as may be desirable for particular applications.

It is necessary that the routing tool 8 should be operated both at a spindle speed (rotational speed) and a feed rate (speed of movement around the path to be cut) which are such that the forces holding the aluminium sheet in position are not overcome by the forces generated by the cutting operation. In general, the maximum spindle speed and maximum feed rate achievable with the particular arrangement will be dependent upon parameters of the cutter chosen such as the material from which it is made and its diameter and on whether or not a coolant is used and, if a coolant is used, the nature of the coolant. The following specific examples will illustrate the invention further.

EXAMPLE 1

A carbide routing tool having a diameter of 10 mm is used without a coolant. Its spindle speed is 18,000 rpm, the thickness of the aluminium sheet 6 is 1.8 mm the backing film is as shown in FIG. 2 with layer 2a being 0.5 mm thick and layers 2b and 2c each being 0.1 mm thick. The maximum feed rate for the routing tool is about 7 meters per minute. Exceeding this feed rate may disturb the sheet 6.

EXAMPLE 2

Parameters are the same as Example 1 except that the aluminium sheet is about 6 mm thick. Because of the increased forces arising from the thicker aluminium sheet, the feed rate is reduced to about 2 meters per minute.

EXAMPLE 3

All parameters are the same as Example 1 except that the spindle speed is increased to 24,000 rpm permitting a maximum feed rate of about 9 meters per minute.

Various modifications are possible within the scope of the invention. For example, although the invention has only been particularly described with reference to the cutting of aluminum is may be used for cutting other sheets, particularly sheets of relatively soft metal. Further, plastics films other than Novacel protection masks may be employed although it is particularly desirable to employ films which can be peeled from the cut sheet whilst leaving a completely clean surface. Although preferably the film used should have a suitable adhesive provided on it which meets these requirements, it may be possible in certain embodiments, where the forces generated during cutting are not too high, to use a plastics film which ahderes without the need for a specific adhesive being provided. Such films are well known.

Although the embodiments illustrated in the drawings and the Examples given above employ particular plastics films, it is possible to put the invention into practice using other forms of film, such as chemically resistant peelable protective coatings which may be applied to the aluminum or other sheet by spraying, dipping or brushing. Such films are known and available from, for example, Turco Products Limited, Brunel Road, Earlstrees Industrial Estate, Corby, North Hants, England. After such films have been applied, they set to a condition in which they remain somewhat plastic but have sufficient strength to retain their integrity after the sheet of aluminum or other material has been cut into components so that the backing sheet with the components attached may be removed as a whole from the machine, whereafter the backing sheet is peeled from the components.

Further, wax-like materials could be used as the backing film.

We claim:

1. A method of cutting a metal sheet using a routing tool, in which a film is adhered to one side of the sheet, the sheet is held firmly in position by vacuum applied to said film and the routing tool penetrates completely through the sheet from the other side but does not penetrate completely through the film.

2. A method according to claim 1, wherein the sheet is aluminum.

3. A method according to claim 1, wherein the film consists of a single layer.

4. A method according to claim 1, wherein the film consists of a plurality of layers adhered to each other.

5. A method according to claim 1, wherein a plurality of components are cut from a single sheet.

6. A method according to claim 1, wherein the routing tool is rotated at a speed of between 10,000 and 30,000 rpm.

7. A method according to claim 6, wherein the speed of rotation of the routing tool is between 15,000 and 25,000 rpm.

8. A method according to claim 1, wherein the routing tool is fed along the path to be cut at a speed not exceeding 9 meters per minute.

9. A method according to claim 8, wherein said speed of feeding does not exceed 7 meters per minute.

10. A method according to claim 9 wherein said speed of feeding does not exceed 2 meters per minute.

11. A method according to claim 1, wherein said film is of a plastics material.

12. A method according to claim 1, wherein said film is of a chemically resistant peelable protective coating material applied to said sheet in liquid form.

13. A method of cutting a metal sheet using a routing tool, in which a film is adhered to one side of the sheet, the sheet is held firmly in position by vacuum applied to said film and the routing tool penetrates the sheet from the other side but does not penetrate completely through the film, said film having sufficient strength to retain its integrity after said cutting of said sheet and having the property of being peelable from said sheet.

14. A method according to claim 1, wherein the routing tool partially penetrates said film.

* * * * *